US011635817B1

(12) United States Patent
Dekel et al.

(10) Patent No.: US 11,635,817 B1
(45) Date of Patent: Apr. 25, 2023

(54) STYLUS HAPTIC COMPONENT

(71) Applicant: Microsoft Technology Licensing, LLC, Redmond, WA (US)

(72) Inventors: Shoham Dekel, Tel Aviv (IL); Uri Ron, Kfar Saba (IL); Assaf Bar-Ness, Ness Zionna (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/450,268

(22) Filed: Oct. 7, 2021

(51) Int. Cl.
  *G06F 3/01* (2006.01)
  *G06F 3/038* (2013.01)
  *G06F 3/044* (2006.01)
  *G06F 3/041* (2006.01)
  *G06F 3/0354* (2013.01)

(52) U.S. Cl.
  CPC .............. *G06F 3/016* (2013.01); *G06F 3/038* (2013.01); *G06F 3/03545* (2013.01); *G06F 3/0441* (2019.05); *G06F 3/04162* (2019.05); *G06F 2203/04108* (2013.01)

(58) Field of Classification Search
  CPC .... G06F 3/03545; G06F 3/016; G06F 1/1647; G06F 3/1423; G06F 1/1649; G06F 2203/04803; G06F 3/1446
  See application file for complete search history.

(56) References Cited

U.S. PATENT DOCUMENTS

| 8,330,733 | B2 | 12/2012 | Petschnigg et al. |
| 9,075,558 | B2 | 7/2015 | Reeves et al. |
| 9,524,030 | B2 | 12/2016 | Modarres et al. |
| 10,635,295 | B2 | 4/2020 | Seo et al. |
| 2012/0162091 | A1 | 6/2012 | Lyons et al. |
| 2012/0242599 | A1 | 9/2012 | Seo et al. |
| 2013/0285957 | A1* | 10/2013 | Kim ............... G06F 3/03545 345/173 |
| 2015/0074564 | A1* | 3/2015 | Proctor .............. G06F 3/04812 715/761 |
| 2017/0364167 | A1 | 12/2017 | Ribeiro et al. |
| 2021/0096732 | A1 | 4/2021 | Sonnino et al. |

OTHER PUBLICATIONS

Nacenta, et al., "Targeting Across Displayless Space", In Proceedings of the SIGCHI Conference on Human Factors in Computing Systems, Apr. 5, 2008, pp. 777-786.
"International Search Report & Written Opinion issued in PCT Application No. PCT/US22/038254", dated Nov. 4, 2022, 13 Pages.

* cited by examiner

*Primary Examiner* — Koosha Sharifi-Tafreshi
(74) *Attorney, Agent, or Firm* — Alleman Hall Creasman & Tuttle LLP

(57) ABSTRACT

Examples are disclosed relating to providing haptic feedback in a stylus while the stylus crosses a gap between two displays. In one example, a method comprises detecting one or more haptic triggering criteria, and at least on condition of detecting the one or more haptic triggering criteria, actuating the haptic feedback component to produce haptic output. A width of the gap between the displays is determined, and a crossing time for a tip of the stylus to cross the gap is calculated using the width of the gap, a stylus velocity, and a stylus direction. At a first time after actuating the haptic feedback component, the method determines that the one or more haptic triggering criteria are not detected. At least on condition of determining that the one or more haptic triggering criteria are not detected, the method continues to actuate the haptic feedback component for the crossing time.

20 Claims, 8 Drawing Sheets

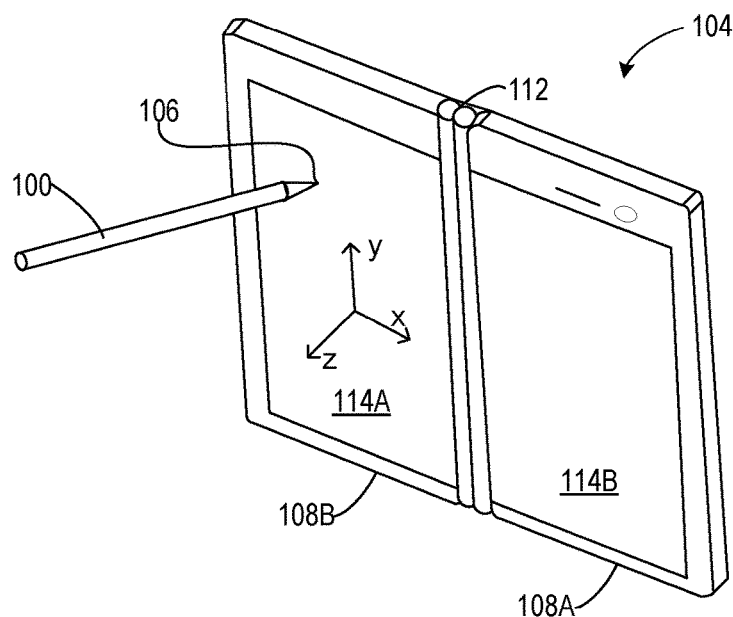
FIG. 1
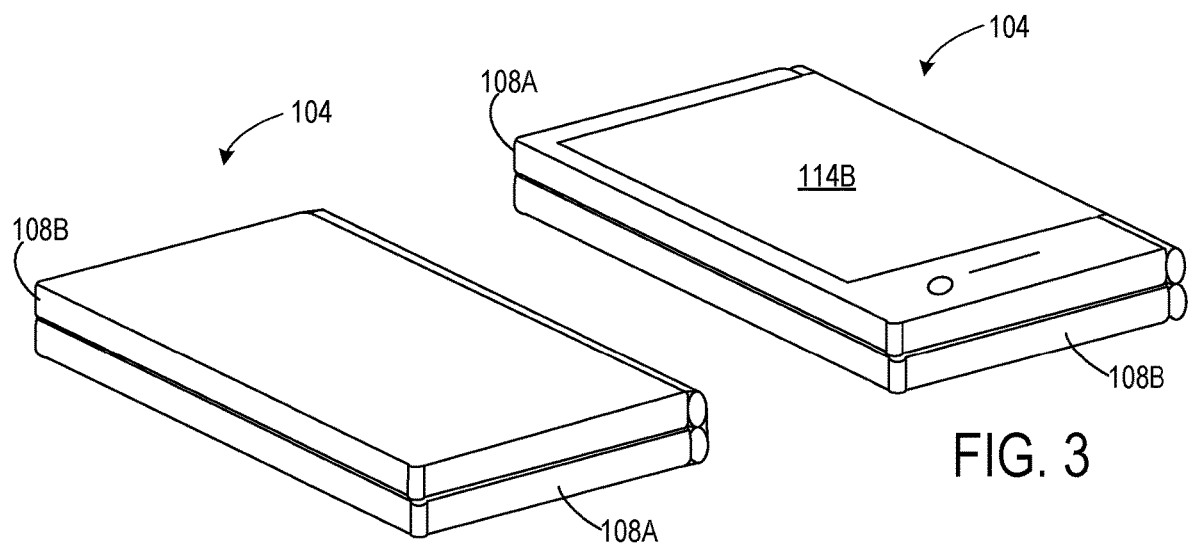
FIG. 2
FIG. 3

STYLUS HAPTIC COMPONENT

BACKGROUND

With many computing devices, a stylus or pen may be used to provide input to the device. Some styli provide haptic output to a user in various use cases. As one example, a stylus may provide vibratory haptic output when haptic triggering criteria are detected, such as an indication that the stylus is contacting a display of a computing device. When the stylus is used with devices that include two displays separated by a gap, avoiding interruptions in haptic output when crossing the gap can prove challenging.

SUMMARY

Examples are disclosed that relate to actuating a haptic feedback component in a stylus while the stylus crosses a gap between a first display and a second display of a computing device. In one example, a method comprises detecting one or more haptic triggering criteria, and at least on condition of detecting the one or more haptic triggering criteria, actuating the haptic feedback component to produce haptic output. A width of the gap between the first display and the second display is determined, and a crossing time for a tip of the stylus to cross the gap is calculated using the width of the gap, a stylus velocity, and a stylus direction. At a first time after actuating the haptic feedback component, the method determines that the one or more haptic triggering criteria are not detected. At least on condition of determining that the one or more haptic triggering criteria are not detected, the method continues to actuate the haptic feedback component for the crossing time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1 shows one example of a stylus and dual-display computing device according to examples of the present disclosure.

FIG. 2 shows the computing device of FIG. 1 folded about a rotation axis according to examples of the present disclosure.

FIG. 3 shows the computing device of FIG. 1 folded into a back-to-back orientation according to examples of the present disclosure.

DETAILED DESCRIPTION

Figure 4:
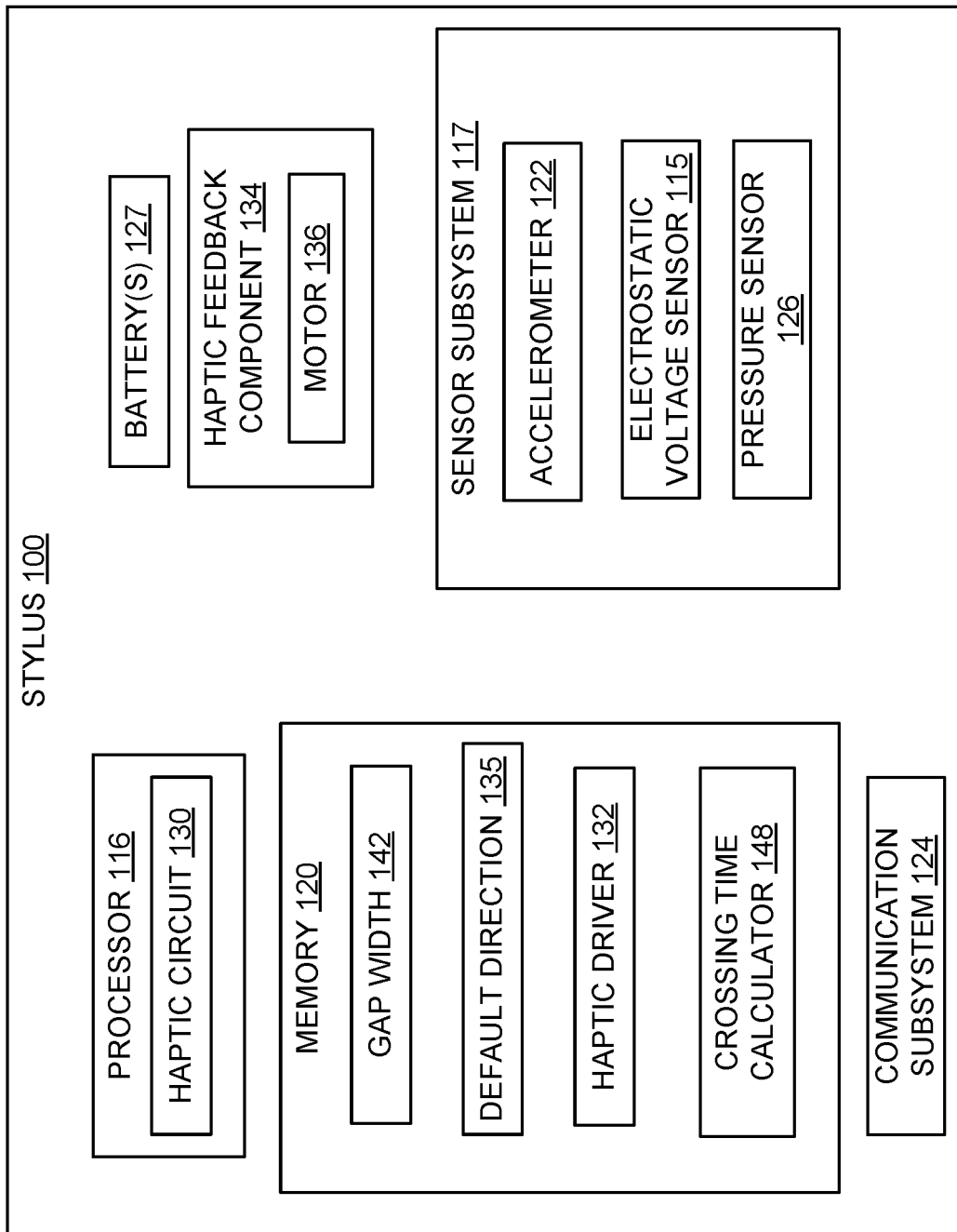
FIG. 4 shows a schematic diagram of components of the stylus of FIG. 1 according to examples of the present disclosure.

As noted above, some styli provide haptic output to a user when one or more haptic triggering criteria are detected. These styli may provide haptic output for a variety of purposes, including but not limited to indicating contact with a display, signaling input to an application (e.g., drawing or writing on a touch-sensitive display screen), and simulating a tactile sensation (e.g., resulting from the traversal of a virtual surface such as gravel, or from touching a virtual object). When the stylus is used with devices that include two displays separated by a gap, in some use cases it is desirable to provide continuous haptic output as the stylus moves from one display across the gap to the other display. However, avoiding interruptions in haptic output when crossing the gap can prove challenging.

Accordingly, examples are disclosed that relate to styli, computing devices, and methods for continuously actuating a haptic feedback component in a stylus while the stylus crosses a gap between a first display and a second display of a computing device. As described in more detail below, in different examples the present disclosure determines a width of the gap between the first display and the second display, and uses the width, a stylus velocity, and a stylus direction to calculate a crossing time for a tip of the stylus to cross the gap. In some examples, the gap width determination comprises an estimated gap width that approximates the actual gap width by making use of one or more factors, as described further below. In some examples, the gap width determination comprises a stored gap width, which may be the actual gap width or may approximate the actual gap width. At a first time after actuating the haptic feedback component in the stylus, it is determined that one or more haptic triggering criteria are not detected. At least on condition of determining that the one or more haptic triggering criteria are not detected, the stylus continues to actuate the haptic feedback component for the crossing time during which the stylus crosses the gap. Advantageously, these techniques enable the continuous provision of haptic feedback while the stylus travels from the first screen across the gap to the second screen.

With reference now to FIGS. 1-3, one example of a computing device is illustrated in the form of a dual screen mobile computing device 104. In other examples, the computing device may take the form of a laptop computing device, tablet computing device, or any other suitable computing device having two or more displays. In the example of FIGS. 1-3, the mobile computing device 104 includes a housing having a first planar substrate 108A and a second planar substrate 108B rotatably coupled by a hinge 112. The first planar substrate 108A includes a first touch screen display 114A and the second planar substrate 108B includes a second touch screen display 114B.

In the example of FIGS. 1-3, the first touch screen display 114A and the second touch screen display 114B are rotatable about hinge 112 relative to each other. The hinge 112 is configured to permit the first touch screen display 114A and the second touch screen display 114B to rotate through 360 degrees between angular orientations from a display-to-display orientation (FIG. 2) to a back-to-back orientation (FIG. 3). In other examples, the first touch screen display 114A and the second touch screen display 114B are rotatable through a range of degrees less than 360 degrees.

FIG. 1 also illustrates one example of a stylus 100 according to examples of the present disclosure. Stylus 100 includes an elongated body in the form factor of a pen, though the body may assume any suitable form. The stylus 100 is operable to provide user input to computing device 104. Any suitable type of user input may be provided to computing device 104 using stylus 100. As examples, stylus 100 may be used to write or draw graphical content on first touch screen display 114A and second touch screen display 114B, modify displayed graphical content (e.g., resize, reposition, rotate), erase graphical content, select graphical user interface (GUI) elements, and/or provide gestural input.

With reference now to FIG. 4, in some examples and to enable the provision of user input from stylus 100 to computing device 104, the stylus may include a communication subsystem 124 that can transmit energy and/or data from the stylus to the computing device. For example, the communication subsystem 124 may include a radio transmitter for wirelessly transmitting data to computing device 104 along a radio link. As another example, the communication subsystem 124 alternatively or additionally may include a capacitive transmitter for wirelessly transmitting data to computing device 104 along a capacitive link. The capacitive link may be established between the capacitive transmitter and first touch screen display 114A or second touch screen display 114B, where each display includes capacitive touch sensors, for example.

Any suitable data may be transmitted to computing device 104 via the communication subsystem 124, including but not limited to indications of pressure sensed at the stylus tip 106, actuation of an input component on the stylus 100 (e.g., depression of one or more buttons), data regarding the position of the stylus relative to the computing device (e.g., one or more coordinates), a power state or battery level of the stylus, and data from one or more motion sensors on-board the stylus (e.g., accelerometer and/or gyroscope data).

It will be understood that any suitable mechanism may be used to transmit information from stylus 100 to computing device 104. Additional examples include optical, resistive, and wired mechanisms. In other examples, styli according to the present disclosure do not include a communication subsystem for transmitting energy and/or data from the stylus to a computing device.

In some examples of the present disclosure, in addition to or instead of transmitting data to the computing device, a stylus is configured to receive energy and/or data from computing device 104. In the example of FIG. 4, stylus 100 includes a sensor subsystem 117 that comprises an electrostatic voltage sensor 115 configured to receive electrostatic energy signals from the first touch screen display 114A and second touch screen display 114B over an electrostatic channel, such as a frequency changing channel. In some examples, these signals are provided by capacitively-coupled currents from electrodes of the first touch screen display 114A and second touch screen display 114B. These signals are amplified and converted to digital signals for use by a processor 116 of the stylus 100.

In some examples, sensor subsystem 117 can include one or more other sensing components and functionalities, such as accelerometer(s), gyroscope(s), inertial measurement unit(s), and force (pressure) sensor(s). In the present example, sensor subsystem 117 includes an accelerometer 122 and a pressure sensor 126 at the tip 106 of stylus 100, such as a piezoelectric crystal that provides an output voltage in response to the pressure imposed upon it.

Example hardware, including processor 116, memory 120 and communication subsystem 124, that may be incorporated by stylus 100 to implement the disclosed approaches, is described further below with reference to FIG. 9. In some examples, the processor 116 includes a haptic circuit 130 configured to execute a haptic driver 132 that controls activation of the haptic feedback component 134. Stylus 100 further includes one or more batteries 127 configured to provide power to processor to the various components of the stylus.

As noted above, stylus 100 is configured to provide haptic feedback to users. To this end, stylus 100 includes a haptic feedback component 134 configured to apply haptic output to the body of the stylus. In different examples, one or more haptic feedback components may be provided at any suitable location within stylus 100. Haptic feedback component 134 may employ any suitable component(s) to provide haptic feedback as described herein. As one example, haptic feedback component 134 may include a motor 136 that applies haptic output to the stylus body in the form of vibration induced in the body. In some examples, multiple haptic feedback components are provided at different locations within a stylus.

As introduced above, in some examples the stylus 100 actuates the haptic feedback component 134 to provide haptic output upon detecting one or more haptic triggering criteria. In one example, the haptic feedback component 134 is actuated when the stylus 100 or computing device 104 determines that the stylus is contacting a surface, such as the first touch screen display 114A or the second touch screen display 114B. For example, a haptic triggering criterion may comprise a pressure signal generated by the pressure sensor 126 in the stylus 100, or an electrostatic signal generated by the first touch screen display 114A or the second touch screen display 114B, or by the stylus 100. In other examples, the haptic triggering criteria may comprise a hover indication that indicates the stylus tip 106 is located within a predetermined hovering distance of the first touch screen display 114A or the second touch screen display 114B. In different examples, the predetermined hovering distance may be 1 cm, 2 cm, or other suitable distance.

At least on condition of detecting the one or more haptic triggering criteria, the haptic feedback component 134 is actuated to produce haptic output. In some examples, a single haptic triggering criterion, such as detection of a pressure signal, triggers actuation of the haptic feedback component 134. In other examples, two or more haptic triggering criteria are required to trigger the haptic feedback component, such as both a pressure signal and an electrostatic signal received by the computing device 104 from the stylus 100. In some examples, the one or more haptic triggering criteria comprise electrostatic indications generated by the computing device 104 that indicates the stylus 100 is moving relative to the computing device.

Figure 5:
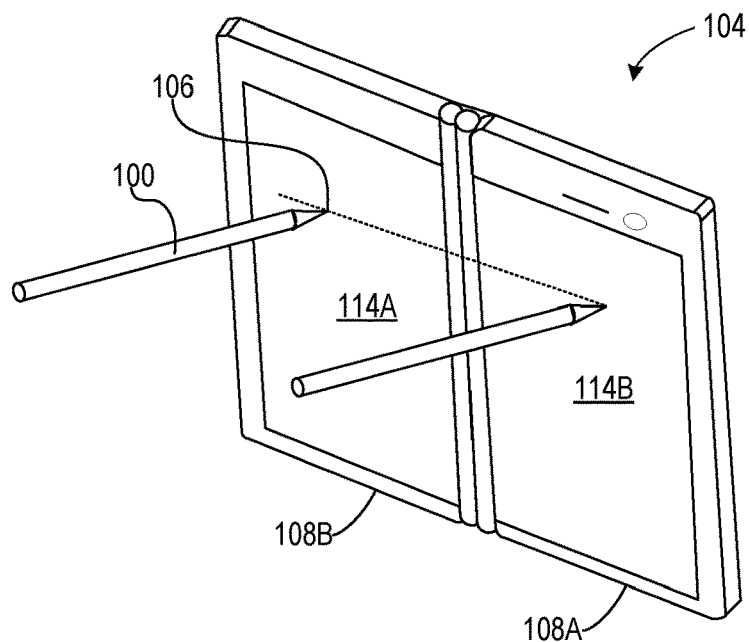
FIG. 5 shows the stylus drawing a line from the first display across a gap to the second display.
Figure 6:
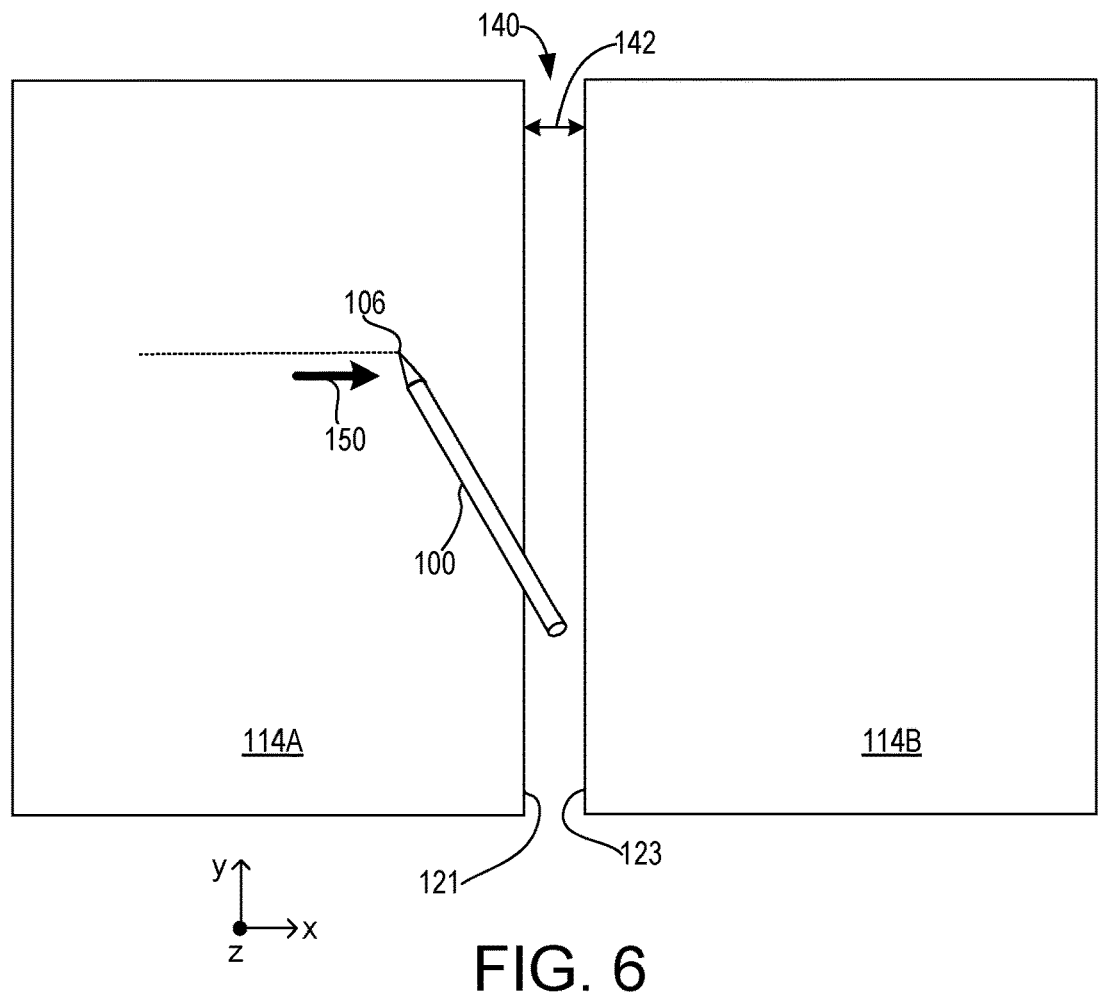
FIG. 6 is a schematic depiction of the two displays of the computing device with the stylus drawing a line toward the gap in the displays.

With reference now to FIGS. 5 and 6 and as noted above, in some use cases a user may operate the stylus 100 to provide a continuous user input that spans across the first touch screen display 114A and the second touch screen display 114B. In the example of FIGS. 5 and 6, the user presses the stylus tip against the first touch screen display 114A, draws a straight line over the gap 140 between the first inside edge 121 of the first touch screen display 114A and the second inside edge 123 of the second touch screen display 114B, and continues drawing on the second touch screen display.

In this example, to trigger the actuation of the haptic output component, the stylus 100 requires detection of a haptic triggering criteria in the form of a pressure signal from the stylus tip 106 indicating contact with a surface. In FIGS. 5 and 6, when the stylus tip 106 contacts the first touch sensitive display 114A, the haptic feedback component 134 is actuated to begin vibrating the stylus. This haptic feedback continues as the stylus tip 106 travels across the surface of the first display 114A. When the stylus crosses the first inside edge 121 of the first display 114A and enters the gap 140, the pressure signal from the stylus tip 106 is lost as the stylus traverses the gap. When the stylus crosses the second inside edge 123 of the second display 114B and contacts the surface of this display, the pressure signal is detected again, and the stylus tip 106 travels across the surface of the second display.

As noted above, it is desirable to provide continuous haptic output when the user continuously moves the stylus from one display across the gap to the other display. However, when the stylus tip is in the gap between displays and the one or more haptic triggering criteria (such as pressure) are not detected, in some examples the haptic feedback will be interrupted and then resumed again when the stylus contacts the second display. This can create a disruptive and less than desirable user experience, with the user feeling the interruption in the haptic feedback between the two displays. Additionally, in other cases where the user moves the stylus along one display and then lifts the stylus off the display, the user expects haptic feedback to cease, and it is desirable to stop providing haptic feedback in these situations.

Accordingly, and to address the above potential drawbacks and provide desirable user experiences across different use cases, and as described in more detail below, examples of the present disclosure determine a width of the gap between the first display and the second display, and utilize this width along with a stylus velocity and a stylus direction to calculate a crossing time for a tip of the stylus to cross the gap. In different examples, the calculated crossing time comprises an estimated time that is based at least in part on the estimated gap width, a stylus velocity, and a stylus direction. When the stylus tip enters the gap, the present disclosure determines that the one or more haptic triggering criteria are not detected. At least on condition of determining that the one or more haptic triggering criteria are not detected, the stylus continues actuating the haptic feedback component for the crossing time while the stylus traverses across the gap.

With reference again to FIG. 6, in one example the user moves the stylus 100 at a velocity of 10 mm/sec along the first touch sensitive display 114A from left to right toward the gap 140. In some examples, the velocity of the stylus 100 is determined by the computing device and is transmitted from the computing device 104 to the stylus 100 via electrostatic signals, radio signals (such as Bluetooth), or any other suitable transmission medium. In some examples, the computing device may utilize x,y coordinates of the changing location of the stylus tip 106 to calculate the velocity. In other examples, such coordinates and/or other data (such as electrostatic signals) may be transmitted from the computing device to the stylus 100, and the stylus may calculate its velocity relative to the first display 114A. In other examples, the stylus 100 utilizes one or more sensors onboard the stylus (e.g., accelerometer(s), gyroscope(s), inertial measurement units) to determine its velocity relative to the first display 114A.

As noted above, and in one potential advantage of the present disclosure, a width 142 of the gap 140 between the first display 114A and the second display 114B is utilized to calculate a crossing time for the tip of the stylus to cross the gap. In some examples, determining the width of the gap comprises retrieving a width 142 stored in a memory of the stylus 100 or the computing device 104. In some examples, the width 142 of gap 140 is stored in the memory of a computing device at manufacturing or at a later time. Advantageously, and as described in more detail below, the computing device 104 and/or stylus 100 utilizes the width 142 of the gap 140 to calculate a crossing time for a tip of the stylus to cross the gap.

In some examples, the width 142 is dynamically determined (e.g., estimated) by the computing device by examining use of the stylus with the device. For example, the computing device 100 may determine locations of the tip 106 of the stylus 100 relative to the first display 114A, the gap 140, and the second display 114B during use and over time. By tracking and using these locations of the tip 106 in combination with instances of not detecting the one or more haptic triggering criteria, the computing device dynamically determines the width 142 of the gap between the two displays. As noted above, in these examples the gap width determination comprises an estimated gap width that approximates the actual gap width and may not exactly match the actual gap width. In these and other examples, determining the width of the gap may comprise transmitting the width of the gap from the computing device 104 to the stylus 100. Additionally, and in one potential advantage of the present disclosure, by examining actual use of the stylus to dynamically determine the gap width as described above, this configuration can provide continuous, uninterrupted haptic feedback to the user while the stylus crosses the gap without requiring or utilizing predetermined gap values stored in memory of the stylus or computing device.

As noted above, the direction of movement of the stylus is also used to calculate a crossing time for the tip of the stylus to cross the gap. In some examples, the stylus direction of movement is a default direction 135 retrieved from a memory of the stylus 100 or the computing device 104. In some examples, cartesian coordinates of the changing location of the stylus tip 106 are calculated by the computing device 104 and utilized to generate a direction vector 150 corresponding to the movement of the tip. In some examples, the direction vector may be transmitted to the stylus 100 and utilized to calculate the crossing time as described further below. In other examples, raw x,y position data of the tip 106 may be transmitted to the stylus 100. In these examples the stylus may determine the direction of travel of the tip 106 and utilize this direction to determine the crossing time. As described further below, the direction of travel may be used to determine an angle with respect to the first inside edge 121 and/or second inside edge 123. In some examples, a default direction 135 comprises a default angle that is stored in a memory of the stylus 100 and/or computing device 104, and utilized as described below. Additionally, and in one potential advantage of this configuration, in some examples utilizing a default direction can reduce communications between the stylus 100 and computing device 104 and/or reduce computational resources otherwise required to determine the direction of travel.

In one example use case and with reference again to FIG. 6, the stylus tip 106 moves at a velocity of 10 mm/sec along the first touch sensitive display 114A from left to right toward the gap 140 in the direction of vector 150, which is orthogonal to the first inside edge 121 of the first touch screen display 114A and the second inside edge 123 of the second touch screen display 114B. In this example the width 142 of gap 140 is 5 mm. As noted above, the width 142 may be determined by retrieving a value from a memory of the stylus 100 or computing device, or by dynamically determining the width as described herein. In this example, the stylus 100 also comprises a crossing time calculator 148 stored in memory 120.

As the stylus tip 106 is moving orthogonal to the first inside edge 121, the stylus 100 or computing device 104 determines that the tip will enter and cross the gap 140 at a 90-degree angle with respect to the first inside edge 121 and second inside edge 123. Given this 90-degree angle and the determined gap width of 5.0 mm, it is then determined that the tip 106 will travel 5.0 mm. between the first inside edge 121 and the second inside edge 123. Alternatively expressed, the tip 106 will travel 5.0 mm as it crosses the gap 140.

Using the determined velocity of 10 mm/sec, the gap width of 5 mm, and the determined 90-degree angle of entry into the gap 140, the crossing time calculator 148 calculates that the tip 106 will travel from the first inside edge 121 to the second inside edge 123 (e.g., across the gap) in 0.5 seconds (5 mm/10 mm/sec=0.5 seconds). Alternatively expressed, the tip 106 will be located in the gap 140 for 0.5 seconds which corresponds to the crossing time.

It will be appreciated that in other examples, the stylus tip direction will not be orthogonal to the first inside edge 121 or second inside edge 123. In these examples, the angle of entry into the gap 140 will result in a travel distance of the tip across the gap 140 that is greater than the gap width 142, and a correspondingly longer crossing time.

In some examples and as noted above, when the stylus tip 106 enters the gap 140, the stylus 100 or computing device 104 determines, at a first time, that one or more haptic triggering criteria are not detected. In one example, the haptic triggering criteria comprises a pressure signal from the stylus tip 106. For example, the stylus 100 and/or computing device 104 may measure or sample the pressure signal at a given sampling rate, such as 1 sample every 4 milliseconds or any other suitable sampling rate. In some examples, using the crossing time and the sampling rate, the stylus 100 coverts the crossing time into the number of pressure signals that will be lost (not received) while the stylus 100 is crossing the gap 140. In the present example, where the stylus 100 calculates a crossing time of 0.5 seconds and the pressure signal sampling rate is 1 sample every 4 milliseconds, the crossing time calculator 148 determines that 125 pressure signal samples will be lost (not received) while the stylus tip 106 crosses the gap 140.

Accordingly, in this example while the stylus tip 106 is contacting and moving along the surface of the first touch screen display 114A, pressure signals from the stylus tip 106 are detected. When the stylus tip 106 crosses the first inside edge 121, the pressure signal is not detected. As noted above, at this first time after actuating the haptic feedback component, the stylus 100 or computing device 104 determines that the pressure signal is not detected. However, because the tip 106 is moving in a direction that crosses the gap 140, and at least on condition of determining that the pressure signal is not detected, the stylus 100 advantageously continues to actuate the haptic feedback component for the determined crossing time, which in this example is 0.5 seconds. Accordingly, and in one potential advantage of the present disclosure, the stylus 100 provides continuous, uninterrupted haptic feedback to the user during the entire user input sequence of drawing a line across the first touch screen display 114A, over the gap 140 between the first touch screen display and second touch screen display 114B, and continuing across the second touch screen display.

Also in this example and using the pressure sampling rate described above, the stylus 100 or computing device 104 determines that 125 pressure signal samples will be lost (not received) while the stylus tip 106 crosses the gap 140. Accordingly and in some examples, when the stylus tip 106 initially crosses the first inside edge 121 and the first pressure signal sample is not detected, the stylus 100 or computing device 104 may begin counting the number of pressure signal samples not received, and continue to actuate the haptic feedback component for a duration that corresponds to 125 pressure signal samples (0.5 seconds).

Advantageously, in this manner the configurations of the present disclosure enable the stylus 100 to provide uninterrupted haptic feedback while the stylus crosses the gap 140 between displays, even though the one or more haptic triggering criteria are not detected.

Figure 7:
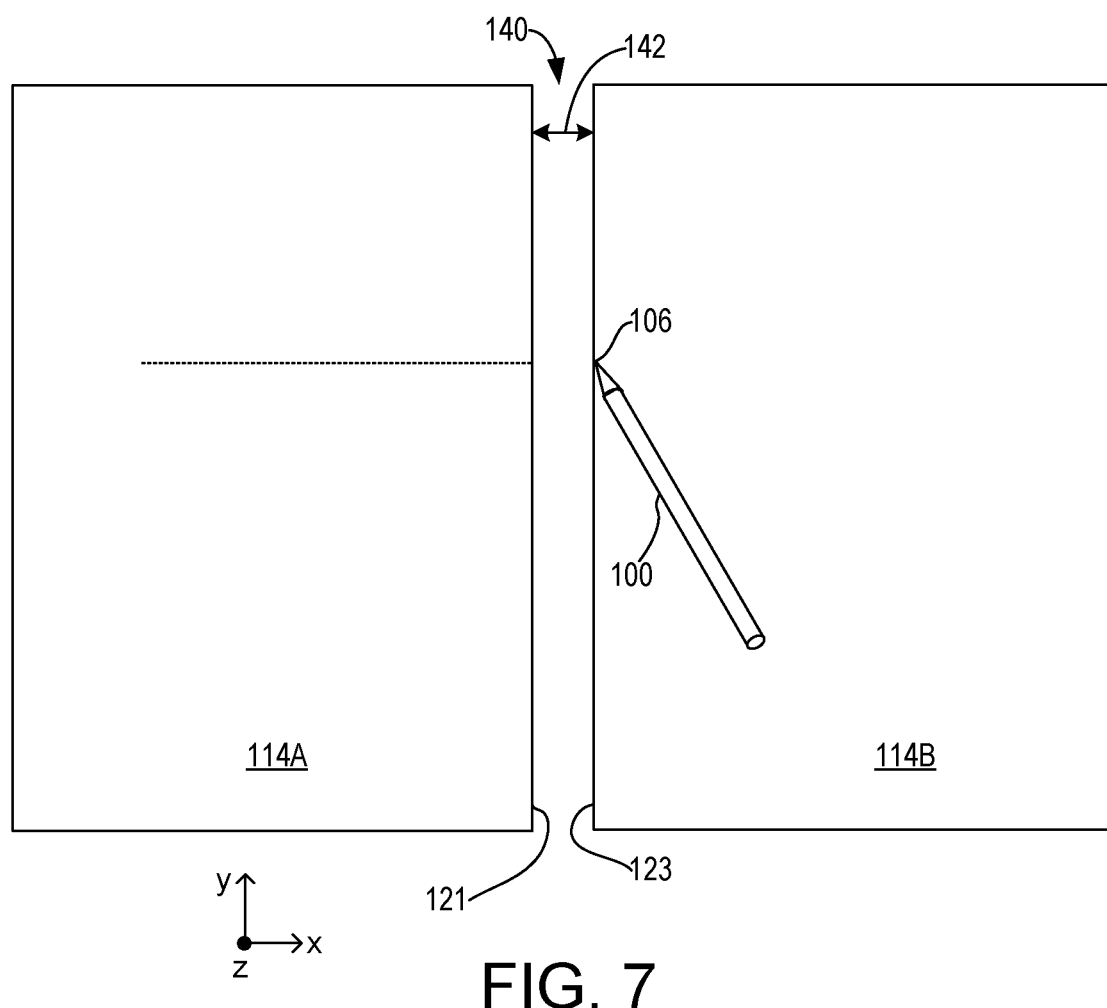
FIG. 7 is a schematic depiction of the two displays with the stylus having crossed the gap in the displays.

With reference now to FIG. 7, at the expiration of the crossing time when the stylus tip 106 reaches the second inside edge 123 of the second touch screen display 114B, the stylus 100 or computing device 104 detects the pressure signal from the stylus tip contacting the second touch screen display. Next, and on condition of detecting the pressure signal at the expiration of the crossing time, the stylus continues to actuate the haptic feedback component and provide haptic output as the stylus tip 106 continues along the surface of the second touch screen display. In this example, and in one potential advantage of the present disclosure, by continuing to provide haptic output on condition of detecting the pressure signal at the expiration of the crossing time, this configuration provides continuous haptic output to the user when the stylus is in an appropriate location for such output (e.g., exiting the gap and contacting the second touch screen display 114B).

In some use case examples, after entering the gap 140 the user does not continue moving the stylus tip 106 to the second inside edge 123. For example, the user may pause the stylus tip 106 within the gap 140 or may lift the stylus 100 away from the computing device 104. In these examples, at the expiration of the crossing time the stylus 100 or computing device 104 determines that the pressure signal is not detected. Next, and on condition of determining that the pressure signal is not detected at the expiration of the crossing time, the stylus ceases actuating the haptic feedback component at the expiration of the crossing time. Accordingly, and in one potential advantage of this configuration, the user is not provided with haptic feedback in situations where such feedback is not appropriate or expected by the user.

In some use cases and as noted above, while the tip of the stylus is crossing the gap 140, the user may lift the stylus 100 away from the computing device 104. In some examples, on condition of determining that a lift distance of the tip above the first display or the second display exceeds a threshold lift distance, the stylus 100 ceases to actuate the haptic feedback component. In these examples, before the expiration of the crossing time, the stylus or computing device determines that the tip 106 of the stylus 100 is located beyond the threshold lift distance, such as 1 cm., 2 cm. or other suitable distance, from the first touch screen display 114A or second touch screen display 114B. In some examples, an electrostatic signal transmitted from the stylus 100 and received at the computing device is utilized to determine that the tip 106 of the stylus 100 is located beyond the threshold lift distance. In some example use cases, and in one potential advantage of this configuration, by utilizing a threshold lift distance as described above, when electrostatic or other interference causes slight errors in the determined lift distance of the stylus tip above a display, the haptic feedback component may continue to actuate when the estimated lift distance is less than the threshold lift distance.

In some examples, environmental noise, such as electrostatic interference, can interfere with one or more sensors in the stylus 100 and/or computing device 104. For example and as noted above, in some examples electrostatic signals are transmitted between the stylus 100 and computing device 104, or vice versa. These signals may be utilized for a variety of purposes, such as determining whether one or more haptic triggering criteria are detected, and transmitting stylus velocity values from the computing device 104 to the stylus 100, or vice versa. In these examples, electrostatic noise can disrupt the corresponding calculations. Accordingly, and in some examples, the computing device 104 or stylus 100 compares a detected environmental noise level to a noise threshold. When the detected noise level exceeds the noise threshold, the duration of the calculated crossing time is adjusted accordingly. For example, in some use cases when the detected noise exceeds the noise threshold, the duration of the calculated crossing time may be increased to account for an expected greater number of lost or degraded electrostatic signals.

In some examples, one or more additional parameters may be utilized in calculating a crossing time for a tip 106 of the stylus 100 to cross the gap 140. For example, to determine a location of the tip 106 of the stylus 100 relative to the gap 140 between the first touch screen display 114A and second touch screen display 114B, the two displays may transmit electrostatic signals to the stylus 100 at different frequencies. In one example, the first display 114A may transmit a first electrostatic signal at a first frequency, and the second display 114B may transmit a second electrostatic signal at a second, different frequency.

Using these signals at different frequencies, the stylus 100 may determine a location of the tip 106 relative to the gap 140 between the first display and the second display. In some examples, the signal strength of the two electrostatic signals is analyzed to determine the location of the tip 106 as it crosses the first inside edge 121, travels across the gap 140, and crosses the second inside edge 123. In some examples, these different electrostatic signals may be utilized in combination with one or more of the stylus velocity, direction, and gap width 142 to calculate the crossing time for the tip 106 to cross the gap, and to correspondingly continue actuating the haptic feedback component for the crossing time. Accordingly, and in another potential advantage of the present disclosure, using different frequencies for different displays as described above may improve the accuracy of determining at which display (and which side of the gap 140) the stylus 100 is located when it nears the gap, thereby correspondingly enabling a haptic feedback user experience that more closely matches user expectations.

In other examples, to determine a location of the tip 106 of the stylus 100 relative to the gap 140 between the first touch screen display 114A and second touch screen display 114B, the two displays may transmit electrostatic signals to the stylus 100 at the same frequencies but during different time windows. In one example, the first display 114A may transmit a first electrostatic signal during a first set of time windows from the first display, and the second display 114B may transmit a second electrostatic signal during an alternating second set of different time windows. For example, the first display 114A may transmit a first electrostatic signal in a time window between 1.0-2.0 ms. Following this transmission and at 2.0 ms, the second display 114B may transmit a second electrostatic signal in a time window between 2.0-3.0 ms, and so forth.

By determining the time window in which an electrostatic signal was received, the stylus 100 can determine which display transmitted the signal. Using these signals received at different times, the stylus 100 may then determine a location of the tip 106 relative to the gap 140 between the first display and the second display. In some examples, the signal strength of the electrostatic signals is analyzed to determine the location of the tip 106 as it crosses the first inside edge 121, travels across the gap 140, and crosses the second inside edge 123. In some examples, these electrostatic signals may be utilized in combination with one or more of the stylus velocity, direction, and gap width 142 to calculate the crossing time for the tip 106 to cross the gap and to correspondingly continue actuating the haptic feedback component for the crossing time. Accordingly, and in one potential advantage of this configuration, using different time windows for detecting signals from the two different displays as described above may improve the accuracy of determining at which display (and which side of the gap 140) the stylus 100 is located when it nears the gap, thereby correspondingly enabling a haptic feedback user experience that more closely matches user expectations.

Figure 8A:
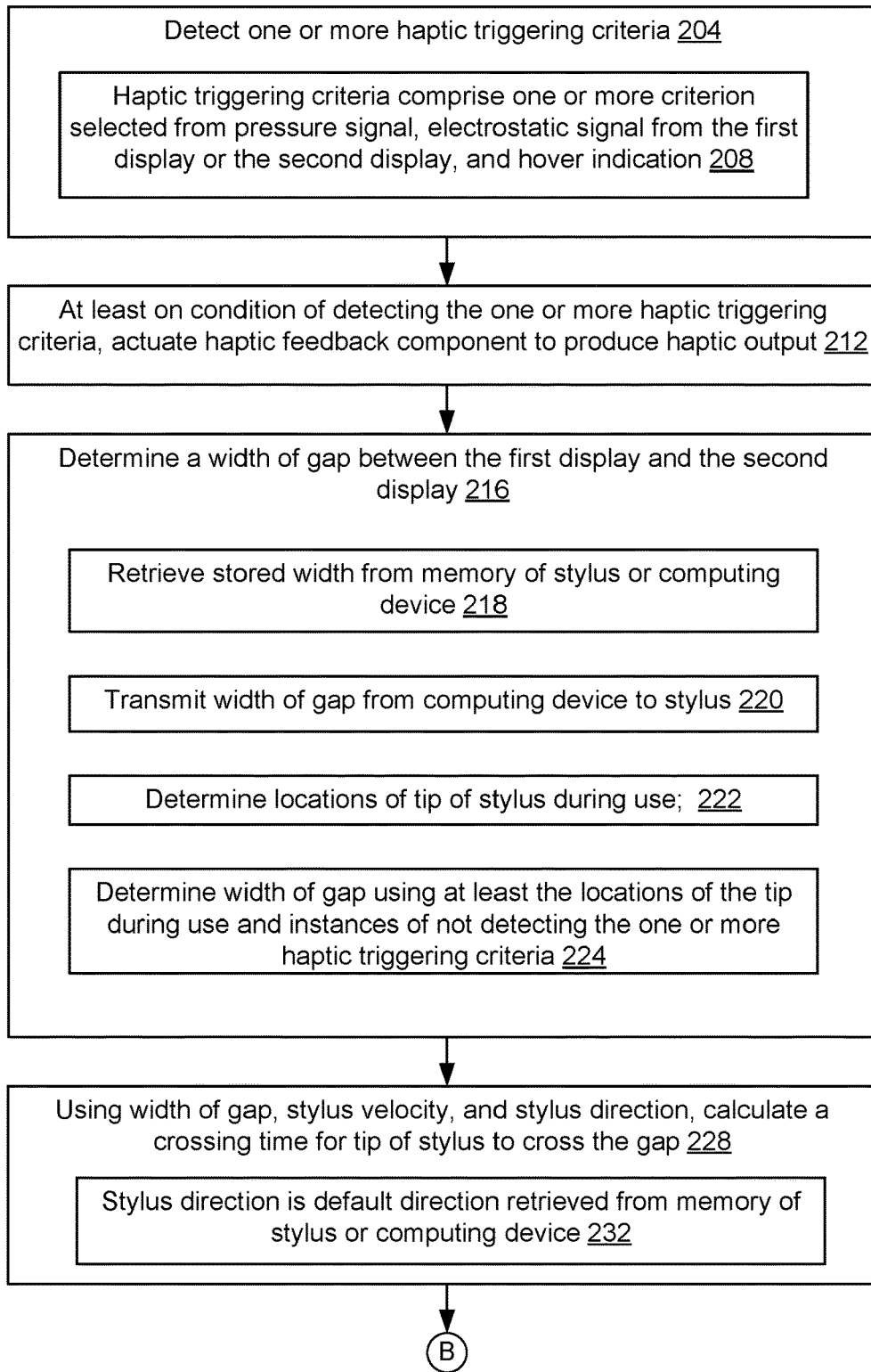
FIGS. 8A-8C show a flowchart illustrating a method for actuating a haptic feedback component in a stylus while the stylus crosses a gap between displays of a computing device according to examples of the present disclosure.
Figure 8B:
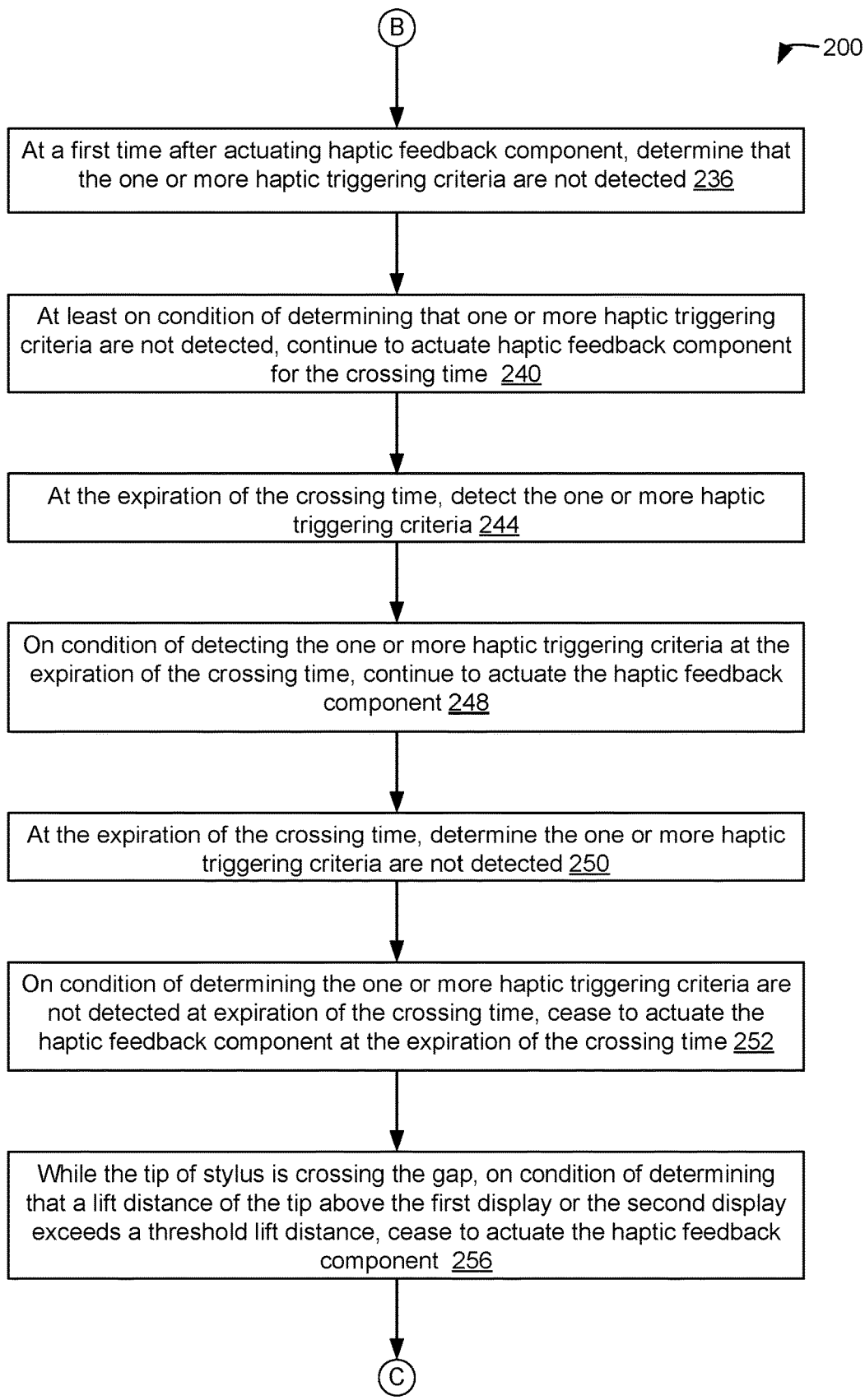
Figure 8C:
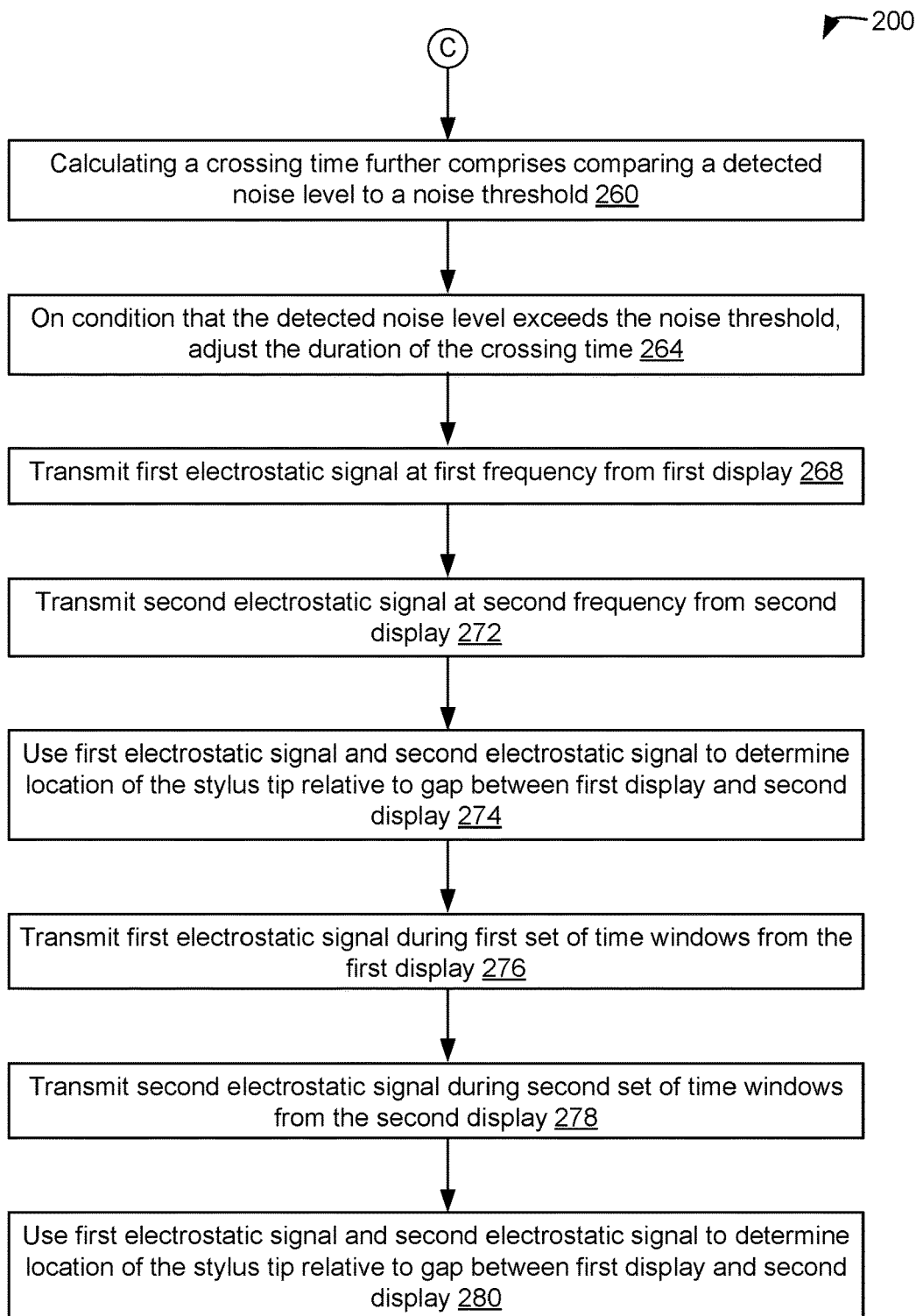

With reference now to FIGS. 8A-8C, a method 200 for actuating a haptic feedback component in a stylus while the stylus crosses a gap between a first display and a second display of a computing device will now be described. As described below, in some examples method 200 may be implemented and performed at a stylus, such as stylus 100. In other examples, one or more steps of method 200 may be implemented and performed at a computing device, such as computing device 104.

The following description of method 200 is provided by way of example and is not meant to be limiting. Therefore, it is to be understood that method 200 may include additional and/or alternative steps relative to those illustrated in FIGS. 8A-8C. Further, it is to be understood that the steps of method 200 may be performed in any suitable order. Further still, it is to be understood that one or more steps may be omitted from method 200 without departing from the scope of this disclosure. It will also be appreciated that method 200 also may be performed in other contexts using other suitable components.

With reference to FIG. 8A, at 204 the method 200 includes detecting one or more haptic triggering criteria. At 208 the method 200 includes, wherein the haptic triggering criteria comprise one or more criterion selected from a pressure signal, an electrostatic signal from the first display or the second display, and a hover indication. At 212 the method 200 includes, at least on condition of detecting the one or more haptic triggering criteria, actuating the haptic feedback component to produce haptic output. At 216 the method 200 includes determining a width of the gap between the first display and the second display. At 218 the method 200 may include retrieving a stored width from a memory of the stylus or the computing device. At 220 the method 200 may include transmitting the width of the gap from the computing device to the stylus. At 222 the method 200 may include determining locations of the tip of the stylus during use. At 224 the method 200 may include determining the width of the gap using at least the locations of the tip during use and instances of not detecting the one or more haptic triggering criteria.

At 228 the method 200 includes, using the width of the gap, a stylus velocity, and a stylus direction, calculating a crossing time for a tip of the stylus to cross the gap. At 232 the method 200 may include, wherein the stylus direction is a default direction retrieved from a memory of the stylus or the computing device. With reference now to FIG. 8B, at 236 the method 200 includes, at a first time after actuating the haptic feedback component, determining that the one or more haptic triggering criteria are not detected. At 240 the method 200 includes, at least on condition of determining that the one or more haptic triggering criteria are not detected, continuing to actuate the haptic feedback component for the crossing time.

At 244 the method 200 may include, at the expiration of the crossing time, detecting the one or more haptic triggering criteria. At 248 the method 200 may include, on condition of detecting the one or more haptic triggering criteria at the expiration of the crossing time, continuing to actuate the haptic feedback component. At 250 the method 200 may include, at the expiration of the crossing time, determining that the one or more haptic triggering criteria are not detected. At 252 the method 200 may include, on condition of determining that the one or more haptic triggering criteria are not detected, ceasing to actuate the haptic feedback component at the expiration of the crossing time. At 256 the method 200 may include, while the tip of the stylus is crossing the gap, on condition of determining that a lift distance of the tip above the first display or the second display exceeds a threshold lift distance, ceasing to actuate the haptic feedback component.

With reference now to FIG. 8C, at 260 the method 200 may include, wherein calculating a crossing time further comprises: comparing a detected noise level to a noise threshold. At 264 the method 200 may include, on condition that the detected noise level exceeds the noise threshold, adjusting the duration of the crossing time. At 268 the method 200 may include transmitting a first electrostatic signal at a first frequency from the first display. At 272 the method 200 may include transmitting a second electrostatic signal at a second frequency from the second display. At 274 the method 200 may include using the first electrostatic signal and the second electrostatic signal to determine a location of the tip of the stylus relative to the gap between the first display and the second display.

At 276 the method 200 may include transmitting a first electrostatic signal during a first set of time windows from the first display. At 278 the method 200 may include transmitting a second electrostatic signal during a second set of time windows from the second display. At 280 the method 200 may include using the first electrostatic signal and the second electrostatic signal to determine a location of the tip of the stylus relative to the gap between the first display and the second display.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
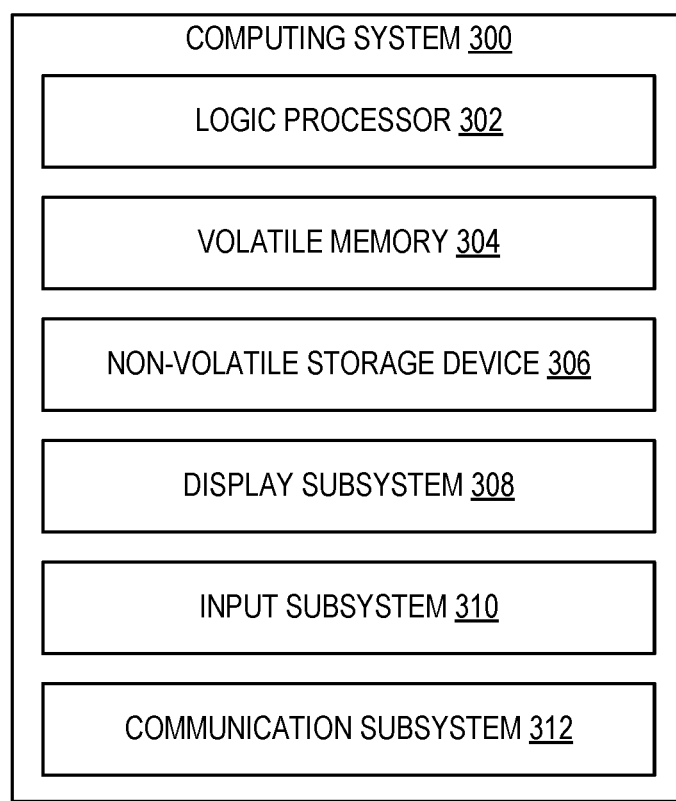
FIG. 9 schematically depicts an example computing system.

FIG. 9 schematically shows a non-limiting embodiment of a computing system 300 that can enact one or more of the methods and processes described above. Computing system 300 is shown in simplified form. One or more aspects of computing system 300 may be utilized in stylus 100 and in the computing device 104 described herein. Computing system 300 may take the form of one or more input devices, personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 300 includes a logic processor 302, volatile memory 304, and a non-volatile storage device 306. Computing system 300 may optionally include a display subsystem 308, input subsystem 310, communication subsystem 312, and/or other components not shown in FIG. 9.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a stylus, keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless personal-, local-, or wide-area network, such as Bluetooth or an HDMI over Wi-Fi connection. In some embodiments, the communication subsystem may allow computing system 300 to send and/or receive messages to and/or from other devices via a network such as the Internet.

The following paragraphs provide additional support for the claims of the subject application. One aspect provides a method for actuating a haptic feedback component in a stylus while the stylus crosses a gap between a first display and a second display of a computing device, the method comprising: detecting one or more haptic triggering criteria; at least on condition of detecting the one or more haptic triggering criteria, actuating the haptic feedback component to produce haptic output; determining a width of the gap between the first display and the second display; using the width of the gap, a stylus velocity, and a stylus direction, calculating a crossing time for a tip of the stylus to cross the gap; at a first time after actuating the haptic feedback component, determining that the one or more haptic triggering criteria are not detected; and at least on condition of determining that the one or more haptic triggering criteria are not detected, continuing to actuate the haptic feedback component for the crossing time. The method may additionally or alternatively include, at the expiration of the crossing time, detecting the one or more haptic triggering criteria; and on condition of detecting the one or more haptic triggering criteria at the expiration of the crossing time, continuing to actuate the haptic feedback component. The method may additionally or alternatively include, at the expiration of the crossing time, determining that the one or more haptic triggering criteria are not detected; and on condition of determining that the one or more haptic triggering criteria are not detected, ceasing to actuate the haptic feedback component at the expiration of the crossing time. The method may additionally or alternatively include, wherein determining the width of the gap comprises retrieving a stored width from a memory of the stylus or the computing device. The method may additionally or alternatively include, wherein determining the width of the gap comprises transmitting the width of the gap from the computing device to the stylus. The method may additionally or alternatively include, wherein determining the width of the gap comprises: determining locations of the tip of the stylus during use; and determining the width of the gap using at least the locations of the tip during use and instances of not detecting the one or more haptic triggering criteria. The method may additionally or alternatively include, wherein the stylus direction is a default direction retrieved from a memory of the stylus or the computing device. The method may additionally or alternatively include, wherein the haptic triggering criteria comprise one or more criteria selected from a pressure signal, an electrostatic signal from the first display or the second display, and a hover indication. The method may additionally or alternatively include, while the tip of the stylus is crossing the gap, on condition of determining that a lift distance of the tip above the first display or the second display exceeds a threshold lift distance, ceasing to actuate the haptic feedback component. The method may additionally or alternatively include, wherein calculating a crossing time further comprises: comparing a detected noise level to a noise threshold; and on condition that the detected noise level exceeds the noise threshold, adjusting the duration of the crossing time. The method may additionally or alternatively include, transmitting a first electrostatic signal at a first frequency from the first display; transmitting a second electrostatic signal at a second frequency from the second display; and using the first electrostatic signal and the second electrostatic signal to determine a location of the tip of the stylus relative to the gap between the first display and the second display. The method may additionally or alternatively include, transmitting a first electrostatic signal during a first set of time windows from the first display; transmitting a second electrostatic signal during a second set of time windows from the second display; and using the first electrostatic signal and the second electrostatic signal to determine a location of the tip of the stylus relative to the gap between the first display and the second display.

Another aspect provides a stylus for use with a computing device comprising a first display and a second display that are separated by a gap, the stylus comprising: a haptic feedback component within the stylus; a logic processor; and a memory storing instructions executable by the processor to actuate the haptic feedback component while the stylus crosses the gap between the first display and the second display, the instructions executable to: detect one or more haptic triggering criteria; at least on condition of detecting the one or more haptic triggering criteria, actuate the haptic feedback component to produce haptic output; determine a width of the gap between the first display and the second display; using the width of the gap, a stylus velocity, and a stylus direction, calculate a crossing time for a tip of the stylus to cross the gap; at a first time after actuating the haptic feedback component, determine that the one or more haptic triggering criteria are not detected; at least on condition of determining that the one or more haptic triggering criteria are not detected, continue to actuate the haptic feedback component for the crossing time. The stylus may additionally or alternatively include, wherein the instructions are executable to, at the expiration of the crossing time: detect the one or more haptic triggering criteria; and on condition of detecting the one or more haptic triggering criteria at the expiration of the crossing time, continue to actuate the haptic feedback component. The stylus may additionally or alternatively include, wherein the instructions are executable to determine the width of the gap by retrieving a stored width from a memory of the stylus or the computing device. The stylus may additionally or alternatively include, wherein the instructions are executable to determine the width of the gap by receiving the width from the computing device. The stylus may additionally or alternatively include, wherein the instructions are executable to: determine locations of the tip of the stylus during use; and determine the width of the gap using at least the locations of the tip during use and instances of not detecting the one or more haptic triggering criteria. The stylus may additionally or alternatively include, wherein the stylus direction is a default direction, and the instructions are executable to retrieve the default direction from a memory of the stylus or the computing device. The stylus may additionally or alternatively include, wherein the haptic triggering criteria comprise one or more criteria selected from a pressure signal, an electrostatic signal from the first display or the second display, and a hover indication.

Another aspect provides a method for actuating a haptic feedback component in a stylus while the stylus crosses a gap between a first display and a second display of a computing device, the method comprising: detecting one or more haptic triggering criteria, wherein the haptic triggering criteria comprise one or more criteria selected from a pressure signal, an electrostatic signal from the first display or the second display, and a hover indication; at least on condition of detecting the one or more haptic triggering criteria, actuating the haptic feedback component to produce haptic output; determining a width of the gap between the first display and the second display; using the width of the gap, a stylus velocity, and a stylus direction, calculating a crossing time for a tip of the stylus to cross the gap; at a first time after actuating the haptic feedback component, determining that the one or more haptic triggering criteria are not detected; at least on condition of determining that the one or more haptic triggering criteria are not detected, continuing to actuate the haptic feedback component for the crossing time; at the expiration of the crossing time, detecting the one or more haptic triggering criteria; and on condition of detecting the one or more haptic triggering criteria at the expiration of the crossing time, continuing to actuate the haptic feedback component.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for actuating a haptic feedback component in a stylus while the stylus crosses a gap between a first display and a second display of a computing device, the method comprising:
   detecting one or more haptic triggering criteria;
   at least on condition of detecting the one or more haptic triggering criteria, actuating the haptic feedback component to produce haptic output;
   determining a width of the gap between the first display and the second display;
   using the width of the gap, a stylus velocity, and a stylus direction, calculating a crossing time for a tip of the stylus to cross the gap;
   at a first time after actuating the haptic feedback component, determining that the one or more haptic triggering criteria are not detected; and
   at least on condition of determining that the one or more haptic triggering criteria are not detected, continuing to actuate the haptic feedback component for the crossing time.

2. The method of claim 1, further comprising:
   at the expiration of the crossing time, detecting the one or more haptic triggering criteria; and
   on condition of detecting the one or more haptic triggering criteria at the expiration of the crossing time, continuing to actuate the haptic feedback component.

3. The method of claim 1, further comprising:
   at the expiration of the crossing time, determining that the one or more haptic triggering criteria are not detected; and
   on condition of determining that the one or more haptic triggering criteria are not detected, ceasing to actuate the haptic feedback component at the expiration of the crossing time.

4. The method of claim 1, wherein determining the width of the gap comprises retrieving a stored width from a memory of the stylus or the computing device.

5. The method of claim 1, wherein determining the width of the gap comprises transmitting the width of the gap from the computing device to the stylus.

6. The method of claim 1, wherein determining the width of the gap comprises:
   determining locations of the tip of the stylus during use; and determining the width of the gap using at least the locations of the tip during use and instances of not detecting the one or more haptic triggering criteria.

7. The method of claim 1, wherein the stylus direction is a default direction retrieved from a memory of the stylus or the computing device.

8. The method of claim 1, wherein the haptic triggering criteria comprise one or more criteria selected from a pressure signal, an electrostatic signal from the first display or the second display, and a hover indication.

9. The method of claim 1, further comprising, while the tip of the stylus is crossing the gap, on condition of determining that a lift distance of the tip above the first display or the second display exceeds a threshold lift distance, ceasing to actuate the haptic feedback component.

10. The method of claim 1, wherein calculating a crossing time further comprises:
comparing a detected noise level to a noise threshold; and
on condition that the detected noise level exceeds the noise threshold, adjusting the duration of the crossing time.

11. The method of claim 1, further comprising:
transmitting a first electrostatic signal at a first frequency from the first display;
transmitting a second electrostatic signal at a second frequency from the second display; and
using the first electrostatic signal and the second electrostatic signal to determine a location of the tip of the stylus relative to the gap between the first display and the second display.

12. The method of claim 1, further comprising:
transmitting a first electrostatic signal during a first set of time windows from the first display;
transmitting a second electrostatic signal during a second set of time windows from the second display; and
using the first electrostatic signal and the second electrostatic signal to determine a location of the tip of the stylus relative to the gap between the first display and the second display.

13. A stylus for use with a computing device comprising a first display and a second display that are separated by a gap, the stylus comprising:
a haptic feedback component within the stylus;
a logic processor; and
a memory storing instructions executable by the processor to actuate the haptic feedback component while the stylus crosses the gap between the first display and the second display, the instructions executable to:
detect one or more haptic triggering criteria;
at least on condition of detecting the one or more haptic triggering criteria, actuate the haptic feedback component to produce haptic output;
determine a width of the gap between the first display and the second display;
using the width of the gap, a stylus velocity, and a stylus direction, calculate a crossing time for a tip of the stylus to cross the gap;
at a first time after actuating the haptic feedback component, determine that the one or more haptic triggering criteria are not detected;
at least on condition of determining that the one or more haptic triggering criteria are not detected, continue to actuate the haptic feedback component for the crossing time.

14. The stylus of claim 13, wherein the instructions are executable to, at the expiration of the crossing time:
detect the one or more haptic triggering criteria; and
on condition of detecting the one or more haptic triggering criteria at the expiration of the crossing time, continue to actuate the haptic feedback component.

15. The stylus of claim 13, wherein the instructions are executable to determine the width of the gap by retrieving a stored width from a memory of the stylus or the computing device.

16. The stylus of claim 13, wherein the instructions are executable to determine the width of the gap by receiving the width from the computing device.

17. The stylus of claim 13, wherein the instructions are executable to:
determine locations of the tip of the stylus during use; and
determine the width of the gap using at least the locations of the tip during use and instances of not detecting the one or more haptic triggering criteria.

18. The stylus of claim 13, wherein the stylus direction is a default direction, and the instructions are executable to retrieve the default direction from a memory of the stylus or the computing device.

19. The stylus of claim 13, wherein the haptic triggering criteria comprise one or more criteria selected from a pressure signal, an electrostatic signal from the first display or the second display, and a hover indication.

20. A method for actuating a haptic feedback component in a stylus while the stylus crosses a gap between a first display and a second display of a computing device, the method comprising:
detecting one or more haptic triggering criteria, wherein the haptic triggering criteria comprise one or more criteria selected from a pressure signal, an electrostatic signal from the first display or the second display, and a hover indication;
at least on condition of detecting the one or more haptic triggering criteria, actuating the haptic feedback component to produce haptic output;
determining a width of the gap between the first display and the second display;
using the width of the gap, a stylus velocity, and a stylus direction, calculating a crossing time for a tip of the stylus to cross the gap;
at a first time after actuating the haptic feedback component, determining that the one or more haptic triggering criteria are not detected;
at least on condition of determining that the one or more haptic triggering criteria are not detected, continuing to actuate the haptic feedback component for the crossing time;
at the expiration of the crossing time, detecting the one or more haptic triggering criteria; and
on condition of detecting the one or more haptic triggering criteria at the expiration of the crossing time, continuing to actuate the haptic feedback component.

* * * * *